United States Patent [19]
Miché

[11] Patent Number: 5,597,188
[45] Date of Patent: Jan. 28, 1997

[54] EARTHQUAKE LATCH

[76] Inventor: John A. Miché, 1405 S. 58th St., Richmond, Calif. 94804

[21] Appl. No.: 491,638

[22] Filed: Jun. 19, 1995

[51] Int. Cl.⁶ ............................................. E05C 1/08
[52] U.S. Cl. ............... 292/183; 292/180; 292/DIG. 22; 292/DIG. 65
[58] Field of Search ................. 292/92, 177, 178, 292/180, 183, 184, DIG. 22, DIG. 65

[56] References Cited

U.S. PATENT DOCUMENTS

| | | | |
|---|---|---|---|
| 1,944,382 | 1/1934 | Wecker | 292/183 X |
| 2,826,444 | 3/1958 | Kurilenko | 292/177 |
| 3,381,992 | 5/1968 | Friesen | 292/87 |
| 3,397,001 | 8/1968 | Friedman | 292/87 |
| 3,879,072 | 4/1975 | Tuley | 292/268 |
| 3,888,525 | 6/1975 | Kousens | 292/87 |
| 3,889,992 | 6/1975 | Sheiton | 292/87 |
| 3,971,237 | 7/1976 | Rasmussen | 70/99 |
| 4,139,249 | 2/1979 | Hillman | 312/333 |
| 4,408,196 | 10/1983 | Freeman | 340/690 |
| 4,416,477 | 11/1983 | Bialobrzeski et al. | 292/19 |
| 4,528,559 | 7/1985 | Freeman | 340/690 |
| 4,623,177 | 11/1986 | McKinney | 292/87 |
| 4,688,023 | 8/1987 | McGill et al. | 340/545 |
| 4,715,628 | 12/1987 | Brink et al. | 292/19 |
| 4,717,184 | 1/1988 | Boyce | 292/87 |
| 4,872,286 | 10/1989 | Peirish et al. | 292/183 X |
| 4,919,464 | 4/1990 | Richards | 292/251.5 |
| 5,001,466 | 3/1991 | Orlinsky et al. | 340/690 |
| 5,035,451 | 7/1991 | Brady | 292/96 |
| 5,076,623 | 12/1991 | Richards | 292/251.5 |
| 5,101,195 | 3/1992 | Caillat et al. | 340/690 |
| 5,152,562 | 10/1992 | Stevenson et al. | 292/252 |
| 5,188,405 | 2/1993 | Maccaferri | 292/204 |
| 5,312,143 | 5/1994 | Buckner | 292/230 |

FOREIGN PATENT DOCUMENTS

| 92208 | 4/1923 | Australia | 292/183 |
|---|---|---|---|

*Primary Examiner*—Rodney M. Lindsey

[57] ABSTRACT

A latching device which detects the initial shocks of major earthquakes and activates safety devices before the onset of destructive ground motions. A unidirectional vertical threshold seismoscope is integrated with mechanical and electromechanical safety devices to latch cabinets closed, secure movable objects, shut off gas, water, and electric utilities, activate alarms, early warning networks, and related automated response systems. The device is fully self contained, requires no external power, and is virtually impervious to nonearthquake noise in that it is designed to respond specifically to the vertical acceleration and displacement characteristic of the initial shock waves of a major earthquake.

8 Claims, 5 Drawing Sheets

*Figure 1a*  *Figure 1b*
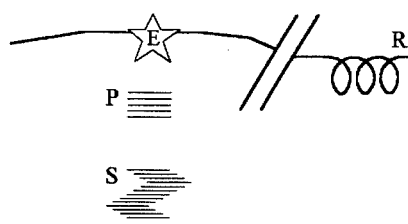
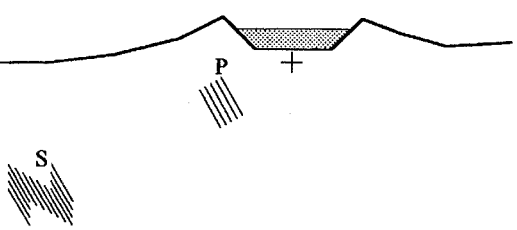
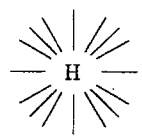
*Figure 2*
*Figure 3*
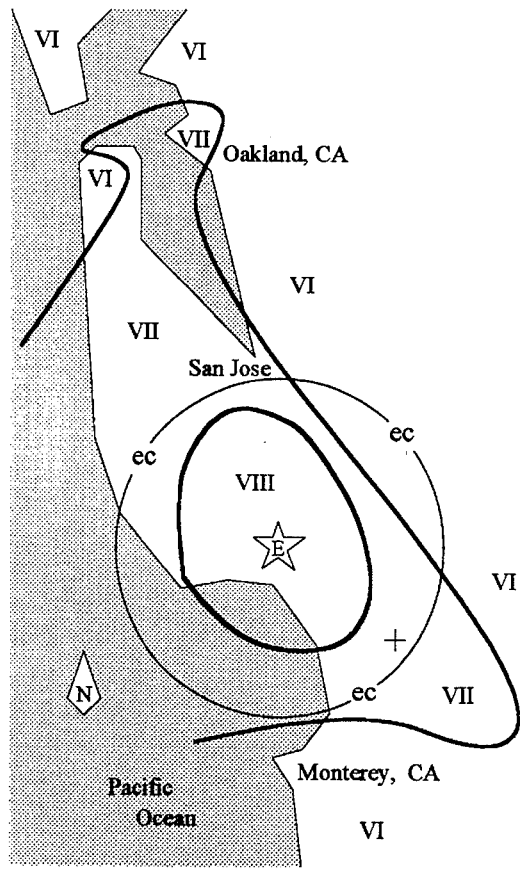
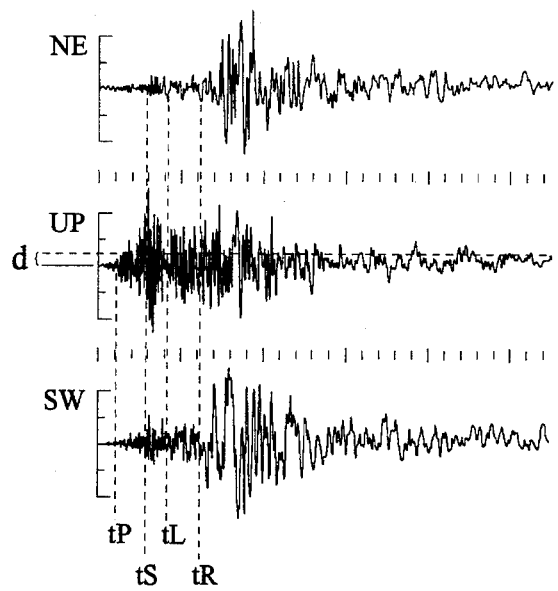
*Figure 4*
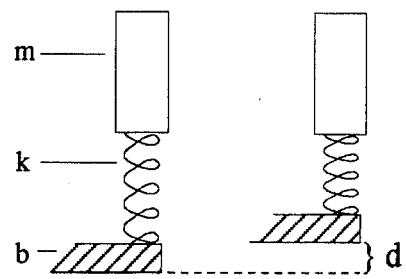

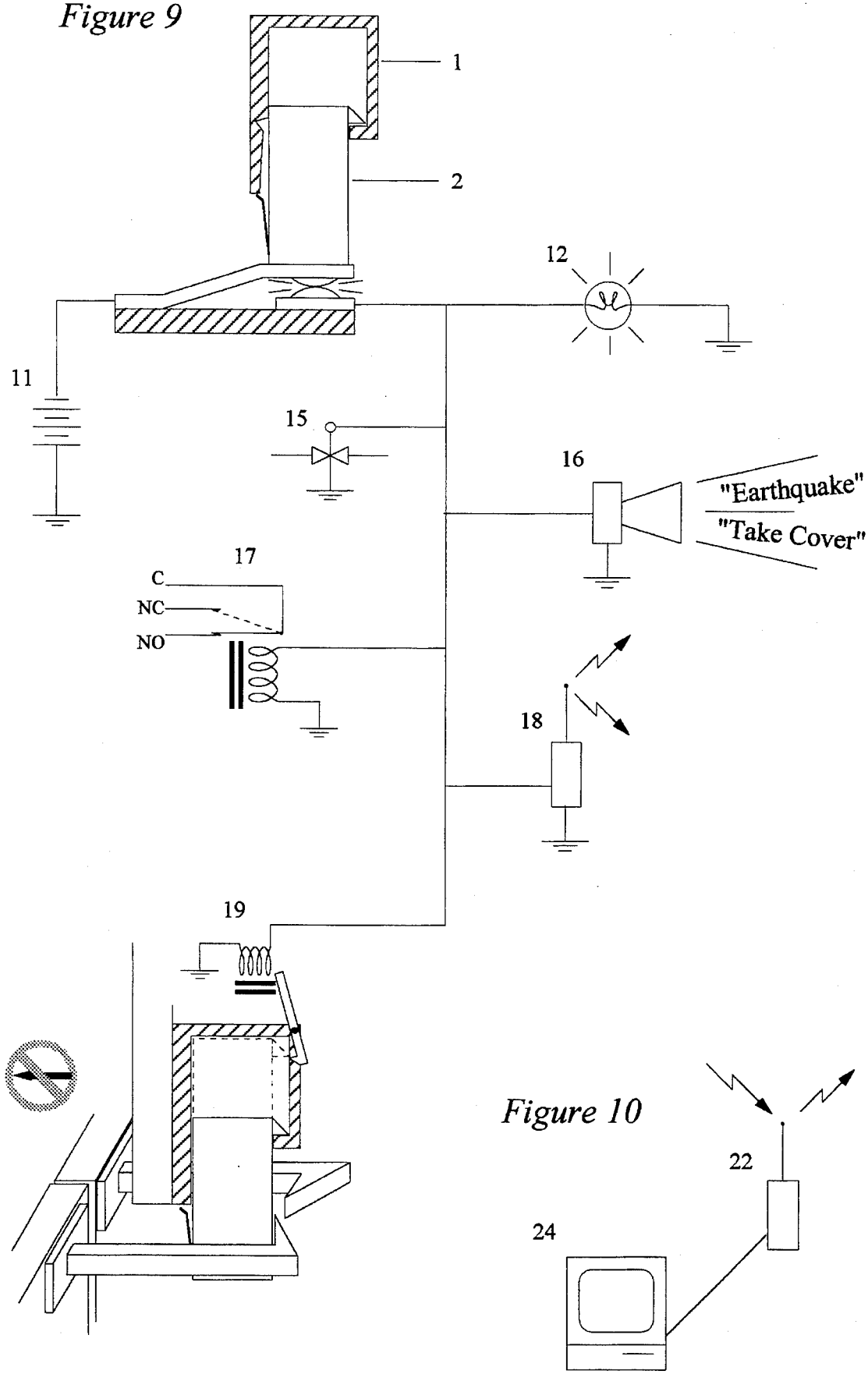

EARTHQUAKE LATCH

FIELD OF INVENTION

This invention relates to a latching device which detects the initial shocks of major earthquakes and activates safety devices before the onset of destructive ground motions.

BACKGROUND

Major earthquakes are known to cause buildings to collapse, dishevel roads, shear pipe lines, disrupt communication, set fires, and inflict injuries which sometimes result in death. While significant advances have been made to reinforce structures against earthquakes, little has been done to reduce secondary hazards. Toppled furniture, objects thrown off shelves and out of cabinets continue to pose a hazard to people and property during a major earthquake. Injuries aside, significant property is lost due to major earthquakes as a result of objects thrown out of cabinets and broken on the floor.

In this regard, a reliable apparatus to detect major earthquakes and activate safety devices would be of benefit. One which initiates safety measures before the onset of the earthquake's destructive ground motions, even more so. A forewarning of a few seconds would be most beneficial by latching cabinets closed, securing objects in place, shutting off gas supplies, deactivating electrical equipment, activating automated safety measures and warning people to take cover so they can safely ride out the earthquake.

Seismologists know well that the P wave of an earthquake precedes all others. Next the S wave, followed by the most destructive L and R surface waves. This sequence is due to the speed and manner by which the various shock waves propagate through and on the earth. The P wave (Primary, compression, push pull) is the fastest, followed by the S wave (Secondary, shear, side to side) both of which propagate directly through the earth. When these body waves reach the surface they give rise to the more destructive L (Love, long undulations) and R (Rayleigh, Rolling) surface waves. Because the P wave propagates faster, directly through the earth, it typically arrives seconds before the S wave, which in turn also arrives seconds before more destructive L and R surface waves.

Conveniently, the amplitude of the P wave provides a direct measure of an earthquake's potential destruction. Combined with the observation that the P wave motion in the vicinity of the epicenter is predominantly up and down results in a distinct precursory measure of an earthquake's potential destruction.

As it turns out, the sequence of shock waves provides a second chance to detect a major earthquake and activate safety devices before the onset of its destructive ground motions. The S wave which follows closely after the P wave also provides a forewarning of the more destructive L and R surface waves. The S wave has both horizontal and vertical components and, like the P wave, the amplitude of the vertical component of the S wave provides a direct measure of the potential destruction of an earthquake.

In either case, it is the vertical component of the P and S waves which provides a direct measure of an earthquake's local magnitude, seconds before the onset of more intense ground motion. No other source on earth produces the unique vertical threshold accelerations and displacements characteristic of the P and S waves of a major earthquake. Given this knowledge, all that is needed is a device which isolates and responds to the initial vertical shocks of a major earthquake and thereby activate safety devices before the onset of more destructive ground motions.

PRIOR ART

The intense horizontal motions of a major earthquake are by far the most destructive. In light of this, much effort is given to design and build structures to withstand these dynamic horizontal loads. Following this line of reasoning, a number of patents have been granted for a variety of safety devices, such as cabinet latches, emergency lights, audible alarms, gas, liquid and electric shut off devices, all of which are activated by horizontal earthquake motions. Given the distinct precursory vertical motions of P and S waves, activating safety devices by the horizontal motions of an earthquake's destructive shock waves, makes little sense.

OBJECTIVES AND ADVANTAGES

The object of this invention is a latching device which detects the initial shocks of a major earthquake and activates safety measures before the onset of the earthquake's most destructive ground motions. A unidirectional vertical threshold seismoscope is integrated with mechanical and electromechanical means to realize a variety of earthquake safety devices. The device is designed to respond to the upthrust (vertical, unidirectional) accelerations and displacements (threshold) characteristic of the P and S waves (Seismoscope) within the epicentral region of a major earthquake (Richter 6, Mercalli VIII or greater). The device provides a reliable measure of an earthquake's initial shock waves, which is crucial to the activation of safety measures, before the most destructive ground motions begin.

The foremost advantage of Earthquake Latch is the reliability of its measure. The unidirectional nature of the device eliminates activation by horizontal motions. Adjusting the inertial mass, spring, and friction forces tunes the spectral response of the device and virtually eliminates activation by nonearthquake sources. The combination of these design characteristics results in a latching device which responds exclusively to initial shock waves near the epicenter of a major earthquake.

When applied to cabinetry the Earthquake Latch provides continuous earthquake monitoring while allowing convenient unobstructed access to the contents of the cabinet. The latch needs no external power, is easy to install, and provides a cost-effective security against the hazard and mess of objects thrown out of cabinets and broken on the floor during a major earthquake. When activated by a major earthquake the device latches cabinets closed before the main shocks begin, keeps them closed during the earthquake and keeps the contents secure inside the cabinet. After the earthquake subsides, the Earthquake Latch is easily reset to allow access to the contents and continued earthquake monitoring.

With the addition of electric contacts, the Earthquake Latch provides a reliable trigger with which to activate electromechanical earthquake safety devices. Latching cabinets closed, securing movable objects in place, shutting off gas and liquid supplies, deactivating electrical devices, activating automated safety responses, and warning people to take cover are just some of the many applications made possible by this latching device. Given this disclosure and a little imagination, the applications to which the Earthquake Latch can be applied are limitless.

DRAWINGS & REFERENCE NUMBERS

FIG. 1a & b A graphic representation of a major earthquake and associated shock waves.

H Hypocenter: the point of origin of an earthquake within the body of the earth

E Epicenter: the point on the surface of the earth directly above the hypocenter P A representation of the P waves S A representation of the S waves L A representation of the L waves R A representation of the R waves +Relative location of the strong motion recorder of FIG. 2.

FIG. 2 A three axis seismogram of the Loma Prieta Earthquake recorded Oct. 18, 1989.

NE: Horizontal seismograph oriented Northwest by Southeast

UP: Vertical seismograph oriented up and down

SW: Horizontal seismograph oriented Southwest by Northeast d The critical displacement associated with the initial shock waves of a major earthquake tP The time at which the vertical motion of the P wave exceeds d.

tS The time at which the vertical motion of the S wave exceeds d.

tL The time at which the L wave begins.

tR The time at which the R wave begins.

FIG. 3 An isoseismal map of the Loma Prieta Earthquake

VI Mercalli intensity VI isoseismal

VII Mercalli intensity VII isoseismal

VIII The epicentral region, Mercalli intensity VIII isoseismal

E Epicenter ec Epicentral Area within 50 kilometers of the epicenter

+Location of the strong motion recorder which made the seismogram of FIG. 2.

FIG. 4 A simple vertical seismoscope m A mass k A spring b A base for the assembly d The critical displacement associated with the initial shock waves of a major earthquake FIG. 5a, b, c, d, e, f, & g Side view cross sections of the Earthquake Latch operation.

1 Latch Frame

1t Threshold

2 Latch Mass

2r Retaining Element

2s Spring a activation threshold acceleration

<a an acceleration less than the activation threshold d The critical displacement associated with the initial shock waves of a major earthquake <d a displacement less than the activation threshold FIG. 6a, b, c & d Side view cross section perspectives of the Earthquake Latch applied to a cabinet.

3a Catch

4a Cabinet Door or Drawer

4f Cabinet Frame

FIG. 7a & b Side view cross section perspectives of the Earthquake Latch applied to a double door cabinet.

3b Another Catch

4b Another Cabinet Door or Drawer

FIG. 8a & b Side view cross sections of the Earthquake Latch with electric contacts.

10a Moving Electric Contact

10b Fixed Electric Contact

11 Battery or other electric power source

12 Electric light

FIG. 9 A schematic diagram of the Earthquake Latch used to activate electromechanical devices.

15 Electromechanical Shut Off Valve for Gas and Liquids

16 Audible Warning Device

17 Electric Relay or other electronic logic circuitry

18 A Radio Transmitter

20 An Electromechanical Cabinet Latch

FIG. 10 A representation of a computerized early warning network.

22 A Radio Transceiver

24 A Computer

DESCRIPTION

FIGS. 1a & b provide a graphic representation of a major earthquake. The P and S waves are generated simultaneously at the hypocenter H of the earthquake and propagate outward in all directions through the body of the earth.

FIG. 1a shows the epicentral region seconds after the onset of a major earthquake and seconds before the P and S waves reach the earth's surface at the epicenter E. The P waves are by nature faster and race ahead of the S waves to arrive ahead of all wave fronts everywhere distant from the hypocenter. Within this epicentral region the P wave motion is up and down and the S wave motion is primarily side to side.

FIG. 1b is a time frame seconds after FIG. 1a and shows an area some distance from the epicenter. The P and S waves have given rise to the L and R waves which propagate outward in all directions from the epicenter on the surface of the earth. At this distance from the hypocenter the time difference between the P and S waves is more pronounced and both arrive everywhere ahead of the more destructive L and R surface waves. As the distance from the epicenter increases, the angle of incidence of the P and S waves with the surface decreases as a function of the distance from the epicenter. Accordingly, the vertical component of the P wave motion decreases, while that of the S wave increases. Clearly, isolating the vertical accelerations and displacements of the initial shock waves of an earthquake is all that is needed to measure its potential destruction.

FIG. 2 is a three axis seismogram of the Loma Prieta Earthquake which occurred near Santa Cruz, Calif. at 5:04 pm on Oct. 18th 1989. The recordings were made by strong motion seismometers located 46 kilometers Southeast of the epicenter at the foot of the San Justo Dam near Hollister, Calif. The top graph NE is a recording of horizontal seismometer oriented Northwest by Southeast. The middle graph UP is a recording of vertical seismometer. The bottom graph SW is a recording of horizontal seismometer oriented Southwest by Northeast.

The seismograph clearly shows that sizable vertical ground displacements characteristic of the P and S waves, were recorded several seconds before more severe ground motions indicted by the horizontal components. The initial shock of the P wave activates the recorder and builds in intensity, exceeding the critical threshold displacement d at time tP. Next the S wave begins and immediately exceeds the vertical threshold d at time tS. This sequence of ground motions is typical of a major earthquake and shows that the vertical motion of the P and S waves exceed the threshold displacement before the onset of the destructive ground motions of the L and R waves at times tL and tR respectively.

FIG. 3 is an isoseismal map of Loma Prieta Earthquake. Mercalli scale intensity VIII was observed within the epicentral region to a distance of 30 kilometers of the earthquake's epicenter. Mercalli VII intensity was observed up 100 kilometers from the epicenter, running in a Northwest to Southeast direction. Mercalli intensity VI and less was observed outside of these contours.

The circle ec encompasses the area within 50 kilometers of the epicenter of the Loma Prieta earthquake. Within this epicentral area, 18 strong motion seismometers recorded the threshold vertical acceleration and displacement characteristic of the P and S waves of a major earthquake. All 18 stations recorded the vertical threshold 2 seconds or more before the onset of destructive ground motions. Clearly, the vertical motions associated with the P and S waves characteristic of a major earthquake, provide reliable measures of its local magnitude before the onset of its most destructive ground motions.

FIG. 4 shows a simple vertical seismoscope comprised of a mass m attached to a spring k on a base b. At rest, the weight of the mass is in equilibrium with the force of the spring. An upward acceleration of the structure results in a downward force on the spring due to the inertia of the mass. When properly assembled, the compression of the spring d corresponds to both the acceleration and displacement experienced by the system.

FIGS. 5a, b, c, d, e, f, & g are side cross section views showing the operation of the Earthquake Latch. All the embodiments claimed for this invention are extensions of this basic apparatus.

FIG. 5a is a cross-sectional view of the Earthquake Latch in its down and locked position. The frame 1 is secured to any convenient element of, or objects within, a structure in contact with the earth. The Latch Mass 2 is shaped with a retaining element 2r and integral spring 2s. The retaining element allows the latch mass to move freely up and down in the frame but keeps it from falling out. The latch mass is kept in its down and locked position by the spring which, in its open position shown here, keeps the latch mass from being thrown back up into the frame by successive vertical earthquake shocks.

FIG. 5b shows how the Earthquake Latch is reset to its up and ready position. The user depresses the spring, so that it clears its locking position, and pushes the latch mass up into the frame. When the latch mass reaches its up and ready position the spring engages the threshold 1t. The latch mass remains in its up and ready position until the assembly experiences an upthrust acceleration and displacement characteristic of the initial shock waves of a major earthquake.

FIG. 5c shows the Earthquake Latch in its up and ready position. The latch mass is held in the frame by the spring and friction forces acting between latch mass and frame. In this configuration, the motion of the latch mass is decoupled from the motion of the frame. An upward vertical displacement of the frame results in a downward vertical displacement of the latch mass due to its inertia. The spectral response of the device is tuned by balancing the inertia force of the latch mass with the spring and friction forces acting between the latch mass and frame. The latch mass will remain in its up and ready position until it experiences a vertical acceleration and displacement large enough to compress the spring and move it past the threshold 1t.

FIG. 5d shows the Earthquake Latch subjected to a vertical displacement d and small acceleration <a characteristic of a low frequency surface waves far from the epicenter of an earthquake. Here the acceleration is too small to compress the spring enough to slide over the threshold. The latch therefore remains in its up and ready position.

FIG. 5e shows the Earthquake Latch subjected to a small displacement <d and acceleration a characteristic of a high frequency waves generated by nonearthquake sources. While the acceleration is sufficient to compress the spring the displacement is too small to move the latch spring past the threshold. The latch therefore remains in its up and ready position FIG. 5f shows the Earthquake Latch subjected to a vertical displacement d and acceleration a characteristic of the initial shock waves of a major earthquake. The inertia of the latch mass overcomes the spring and once over the threshold, the latch mass continues to fall into its down and locked position.

FIG. 5g shows the Earthquake Latch in its down and locked position where the spring keeps the latch from being thrown back up into the frame by further earthquake motions. The latch will remain down and locked until reset by the user.

FIGS. 6a, b, c & d provide cross-section perspectives of the Earthquake Latch used to secure a cabinet door or drawer.

FIG. 6a shows the Earthquake Latch in its up and ready position. A flexible catch 3a is fastened to the door of the cabinet 4a. The frame of the Earthquake Latch is fastened to the cabinet frame 4f in a similar way.

FIG. 6b shows that the Earthquake Latch in its up and ready position does not interfere with the catch on the cabinet door, allowing unobstructed access to the cabinet while providing continuous earthquake monitoring.

FIG. 6c shows the Earthquake Latch which has been activated by the initial shock waves of a major earthquake. The latch mass is in its down and locked position where it engages the catch and latches the cabinet closed. If the cabinet happens to be open when the earthquake occurs, the sideways orientation of the flexible catch allows it to slide by the latch mass, to engage it and latch the cabinet closed, when the door (drawer) slams shut. In either case, once the cabinet is latched, its contents remain secure inside until the earthquake subsides and the Earthquake Latch is reset by the user.

FIG. 6d shows how the Earthquake Latch is reset after a major earthquake. The length and flexibility of the catch allows the user to get a hand in the cabinet and push the catch clear of the latch mass to open the cabinet door (or drawer). Once the cabinet is open the Earthquake Latch is reset as shown in FIG. 5b.

FIGS. 7a & b provide a perspective view of the earthquake latch applied to a double door cabinet.

Figure 5A:
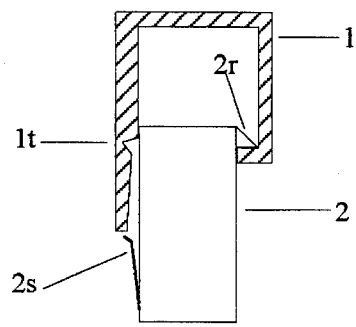
Figure 5B:
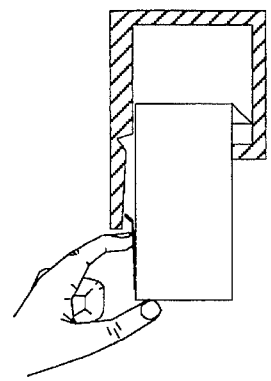
Figure 5C:
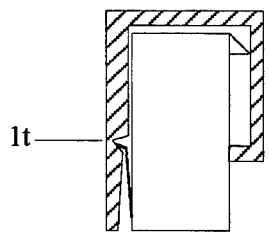
Figure 5D:
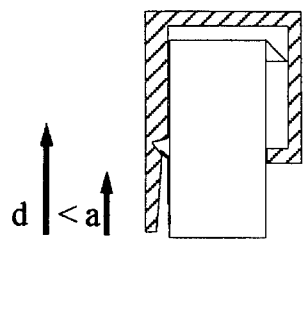
Figure 5E:
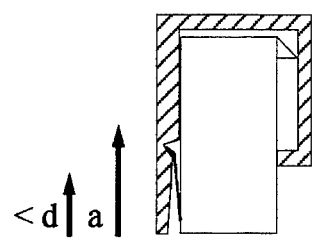
Figure 5F:
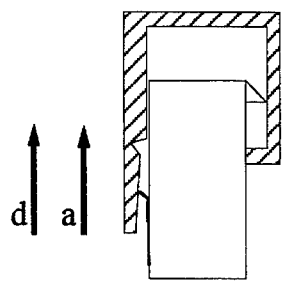
Figure 5G:
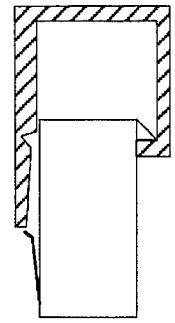
Figure 6A:
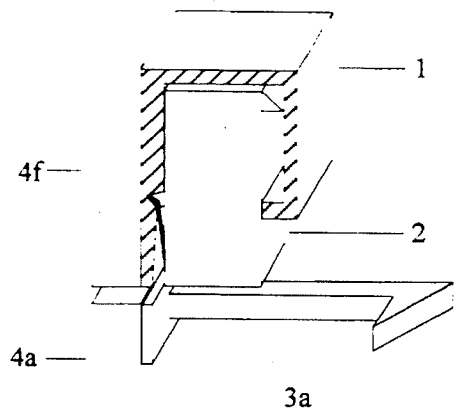
Figure 6B:
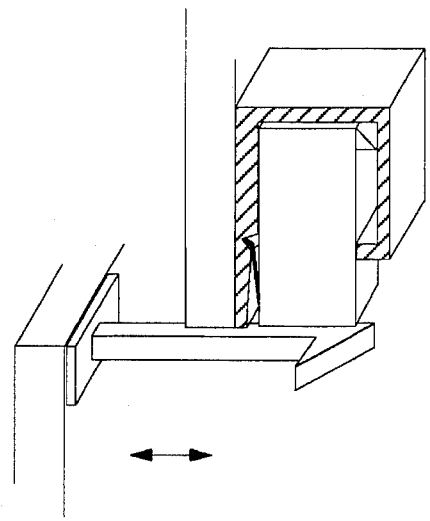
Figure 6C:
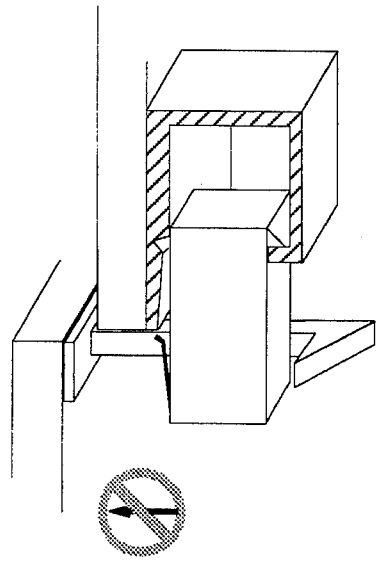
Figure 6C:
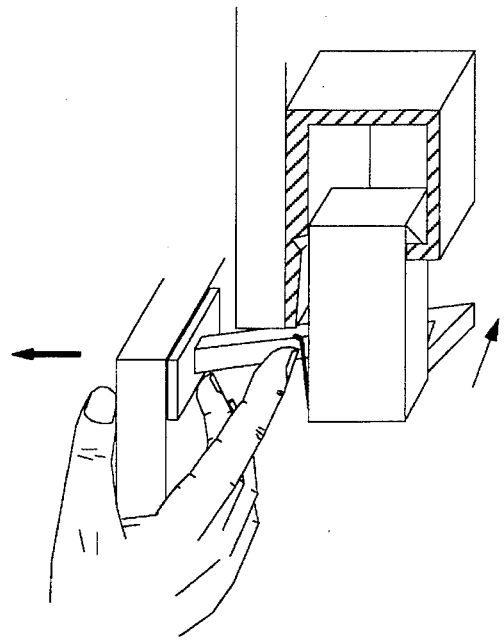
Figure 7A:
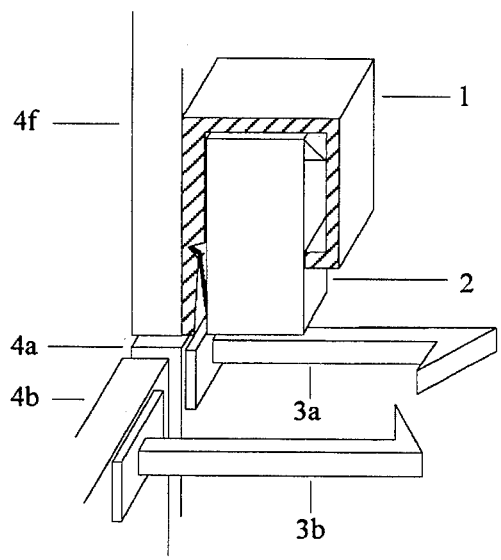
FIG. 7a shows the Earthquake Latch in its up and ready position. As in FIG. 6b the latch does not interfere with the catches 3a and 3b fastened to the cabinet doors allowing unobstructed access to the cabinet through either door, while providing continuous earthquake monitoring.
Figure 7B:
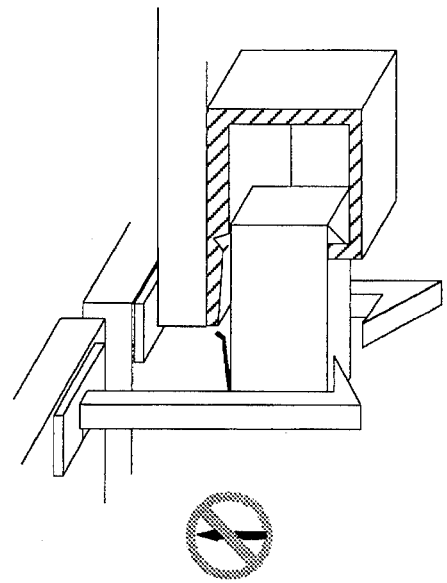
FIG. 7b shows the Earthquake Latch after it has been activated by the initial shock waves of a major earthquake.

In its down and locked position, the latch mass engages both door catches, keeping the cabinet closed and the contents secure inside during the most severe earthquake motions. When the earthquake subsides, the latch can be reset as shown in FIGS. 6d and 5b.

Figure 8A:
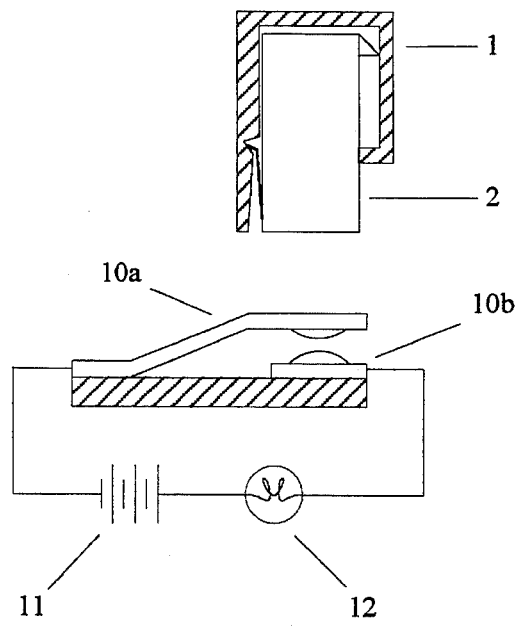

FIGS. 8a & b provide a side cross-section view of the Earthquake Latch used in conjunction with with electric contacts.

FIG. 8a shows the Earthquake Latch in its up and ready position. The electric contacts 10a and 10b are open as well as the circuit comprised of a battery 11 and electric light 12. In this configuration, the circuit consumes no power.

Figure 8B:
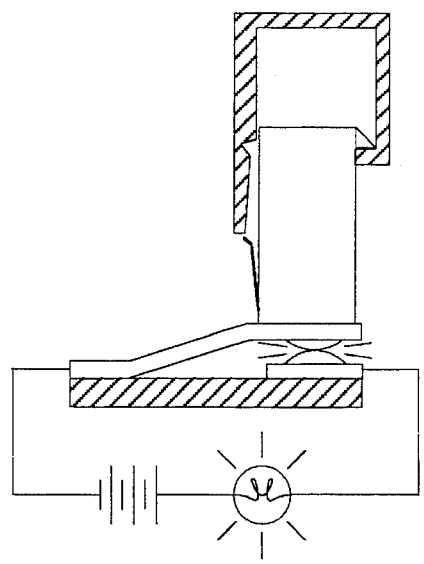

FIG. 8b shows the Earthquake Latch after it has been activated by the initial waves of a major earthquake. The latch mass has moved to its down and locked position, closing the contacts, completing the electric circuit, and allowing current to flow from the battery through the light. The latch remains in its down and locked position and the light lit, until reset by the user as shown in FIGS. 5b.

FIG. 9 is a schematic diagram of an Earthquake Latch with electric contacts connected to various electromechanical earthquake safety devices. A Battery 11 is shown, but obviously any suitable electric power source would suffice. As in FIG. 8, the lamp 12 lights when the Earthquake Latch is activated by the initial shock waves of a major earthquake. Similarly, all of the safety devices connected to the circuit will be activated as well.

An electromechanical shut off valve 15 shuts off gas and liquid supplies. Multiple shut off valves in a piping system would allow for the isolation of broken sections, minimizing material loss and allowing limited operation immediately after the earthquake.

An audible alarm 16 uses a solid-state recording device to store a verbal message which warns people to take cover before the onset of the earthquake's destructive ground motions. The recording also stores verbal instructions for use after the earthquake subsides, reminding people to check for gas leaks and structural damage, first aid instructions, phone numbers, and how to reset the Earthquake Latch.

An electric relay 17 can shut down electrical equipment, activate other electromechanical safety devices, and initiate automated safety systems. Stopping passenger trains, putting automated industrial processes, such as chemical refineries and the like, in a safe standby mode, and stopping elevators at the nearest floor and opening the doors to let passengers out, are just some of the many automatic safety operations made possible by the Earthquake Latch.

A radio transmitter 18 activates early warning networks at remote locations increasing the advance warning to more than 10 seconds. This would provide additional time to stop passenger trains, put industrial processes on standby, isolate pipeline supply networks, and evacuate elevators at the nearest floor.

An electromechanical latch 20 latches cabinet drawers and doors closed, keeping the contents from spilling out during the earthquake. Similar electromechanical latch mechanisms can be applied to secure large and small movable objects during a major earthquake.

FIGS. 10 shows a transceiver 22 connected to a computer 24. The transceiver receives radio transmissions from remote transmitters activated by Earthquake Latches 18. The computer analyzes the time and location of the many signals received and calculates the magnitude, location and epicentral region of the earthquake. Based on the analysis, the computer then transmits an early warning to more remote locations outside of the epicentral area to prepare for the main shocks. This early warning of several seconds would be most useful to safely shut down pipelines, passenger trains, elevators, refineries, warn people to take cover, and the like so as to ride out the earthquake and minimize damage to persons and property.

SUMMARY

The latching device described here embodies the observation that the vertical acceleration and displacement of the initial shock waves of an earthquake provides a reliable measure of its potential destruction. The device is completely insensitive to horizontal motions which eliminates much of the noise from nonearthquake vibrations and can be specifically tuned to the vertical acceleration and displacement thresholds characteristic of the P and S waves of a major earthquake. The result is a reliable latching device which detects the initial shocks of a major earthquake and secures objects against damage before the onset of destructive ground motions. With the addition of electric contacts, the Earthquake Latch can be readily applied to a variety of earthquake safety applications.

The use of a unidirectional threshold vertical seismoscope to detect the initial shock of a major earthquake and activate safety devices is common to all the embodiments. Given this disclosure, anyone reasonably skilled in the art would have no difficulty composing further variations on this theme. As with all disclosures of this type, the foregoing is not intended to limit the scope of the invention but simply provide illustrations of the present preferred embodiments.

Accordingly, the scope of this invention should be determined by the following claims.

I claim:

1. A latch which detects the initial shocks of major earthquakes and locks cabinet doors and drawers closed before the onset of destructive ground motions, comprised of;

a) a frame for fastening to objects within, or elements of, structures in contact with the earth;

b) and a latch mass suspended within the frame by an integral spring and friction forces acting between the latch mass and frame, so as to decouple the motion of the latch mass from that of the frame, allowing the latch mass to move vertically downward, when the frame experiences the upward acceleration and displacement characteristic of the initial shocks of a major earthquake;

c) the spring being adjustable to friction forces acting between the latch mass and frame so as to tune the spectral response of the latch mass specifically to the acceleration and displacement characteristic of the initial shocks of major earthquakes;

d) means to retain the latch mass in an extended position below the frame when the latch is activated;

e) means to keep the latch mass down and locked in its extended position below the frame;

f) means to reset the latch mass to its up and ready position within the frame so as to be ready to detect another major earthquake or its after shocks;

g) and a flexible catch which is fastened to cabinet doors or drawers so that it engages the latch mass when the latch mass is in its down and locked position and restricts the motion of cabinet doors or drawers;

h) means to release the catch after the earthquake subsides so as to reset the latch mass to its up and ready position to detect another major earthquake or after shocks.

2. A flexible catch as in claim 1 set relative to the latch mass, so as to prevent the catch from shoving the latch mass backup into the frame prematurely if the cabinet door or drawer-is open, when the latching device is activated by the initial shocks of a major earthquake, the catch flexible to ride around the latch so that it then engages the latch restricting the cabinet door or drawer from opening during the remainder of the earthquake.

3. The latching device as in claim 1 with multiple catches to latch double, and multiple cabinet doors and drawers.

4. A latching device as in claim 1 to which electric contacts are attached so that the contacts close completing an electric circuit when the latch mass is in its down and locked position having been activated by the initial shocks of a major earthquake.

5. A latch as in claim 4 connected to electrical and electromechanical safety devices with means to turn on safety lights, actuate gas and liquid shut off valves, activate alarms, open and closes relay contacts to deactivate or activate electric circuits and equipment as needed, activate early warning alarms and networks, and latch additional cabinet doors and drawers closed.

6. A latching device as in claim 5 wherein an early warning alarm is comprised of a solid-state recording of a verbal message instructing people to take cover before the main shocks arrive.

7. A latching device as in claim 5 which energizes an electric relay or similar digital logic to shut off electrical equipment or alter the normal operation of automated systems selected from one of elevators or trains to secure their operations so as to safely ride out the earthquake.

8. A latching device as in claim 5 which energizes an electric relay or similar digital logic to alter the normal operation of an elevator enabling the elevator to stop at the nearest floor, open the doors, and instruct passengers to exit the elevator so as to safely evacuate the elevator before the main shocks of the earthquake arrive.

* * * * *